Oct. 15, 1968  A. BOTTANI  3,405,882

FILM EXTENSION MEANS FOR AUTOMATIC FILM PROJECTORS

Filed Jan. 12, 1966

INVENTOR
ANGELO BOTTANI
BY
ATTORNEYS.

3,405,882
FILM EXTENSION MEANS FOR AUTOMATIC
FILM PROJECTORS
Angelo Bottani, Milan, Italy, assignor to Società Internazionale Fonovisione S.p.A., Milan, Italy, a corporation of Italy
Filed Jan. 12, 1966, Ser. No. 520,152
Claims priority, application Italy, Jan. 12, 1965, 555/65
4 Claims. (Cl. 242—74)

ABSTRACT OF THE DISCLOSURE

A film extension means for detachably connecting a film leader to a film transport mechanism, the film extension means having a V-shaped body with a V-shaped recess therein, an upper film seating surface with threaded bosses extending upwardly therefrom through registered apertures in the film leader, a locking plate overlying the film and the bosses and having apertures registered with the bosses and screws extending through the plate apertures and being threadedly secured to the threaded apertures in the bosses for clampingly securing the film leader to the film extension means.

---

This invention relates to the art of motion picture film for use in connection with automatic film projectors, and more particularly to an improved extension means for the free end of such film implementing its engagement with the take-up reel of an automatic projector.

A variety of apparatus has been evolved implementing the automatic feeding of film and associated sound track for projection and sound reproduction purposes. Such apparatus as disclosed in U.S. Patent No. 3,081,668 permits the presentation of audiovisual material in coin operated apparatus, or other equipment where a variety of different films are to be selectively projected. In arranging a plurality of films in such apparatus for selective transport through the apparatus and take-up on a take-up reel, it is necessary to insure the desired movement of the leader end of the film, and the engagement of this leader end by the take-up reel.

It is with the above considerations in mind, that the present improved film extension means has been provided adapted for simple securement to the free leader end of a film implementing the facility with which this leader end may be engaged by film transport mechanisms of automatic projection equipment, and implementing the facility with which the free end of the film is engaged for winding on the take-up reel of such projection equipment.

It is accordingly among the primary objects of this invention to provide extension means for the leader end of a film implementing the facility with which the film may be carried by the transport mechanism of automatic projection equipment and engaged on the take-up rel of such equipment.

A further object of the invention is to provide a film extension means for the free leader end of a film to be used in automatic projection equipment which may be secured to this free film end with minimum manipulative effort.

It is also an object of the invention to provide a film extension means which offers little likelihood of damaging the film to which it is secured.

These and other objects of the invention which will become hereafter apparent are achieved by providing a film extension means having a base portion with an upper wall having a relatively smooth film seating surface. This base portion is formed with a hollow transport arm engaging recess beneath the film seat. Reel engaging pins are extended from this base portion for engagement by the cam surfaces of the reel of the film projecting apparatus. A locking plate is provided for removable securement over the film on the film seat to securely maintain the film in desired position with respect to the extension means base.

Among the features of the invention is the formation of the film seating surface with protuberances adapted to extend through the film so as to implement the engagement of the extension means with the film.

Another feature of the invention resides in the formation of the locking plate to extend over the full area of the film seating surface of the extension means base so as to distribute the stresses exerted by the extension means on the film, thereby minimizing the likelihood of film damage.

The specific details of a preferred embodiment of the invention, and their mode of functioning will be particularly pointed out in clear, concise and exact terms in conjunction with the accompanying drawing, wherein.

Figure 1:
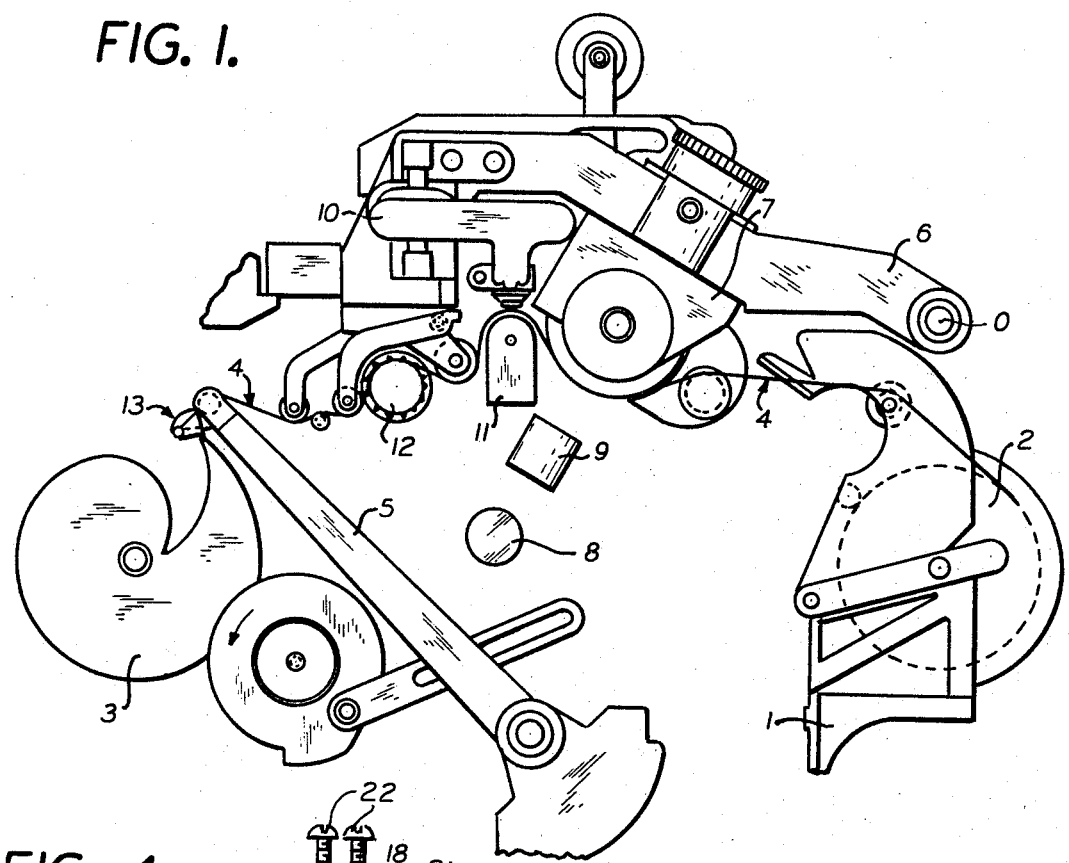
FIG. 1 is a schematic view of the pertinent portions of a film projector of the type in conjunction with which the improved film extension means may be employed.

Referring now more particularly to the drawings, as seen in FIG. 1, automatic film projection apparatus in connection with which the novel film extension means is to be employed is schematically shown as including a framework 1 on which the film supply reel 2 is rotatably mounted. The film 4 from film supply reel 2 is fed through the mechanism to take-up reel 3 (at the left side of the drawing). The film 4 is trained through the mechanism from the supply reel 2 to the take-up reel 3, over a pivotally mounted oscillating film feed transport arm 5. Pressure arm 6 pivotally mounted at point O supports film guiding mechanism serving to train the film in the orientation illustrated in FIG. 1 during film projection. Pressure arm 6 moves about this point O away from the film during rewinding of the film on to supply reel 2.

Pressure arm 6 supports prism 7 which acts with lamp 8 and condenser lens 9 to provide the optical projection system of the apparatus. Sound head 10 is also supported on pressure arm 6 and cooperates with transducer photo cell 11 to provide the sound reproducing system of the apparatus. Suitable rollers guide the film which is moved through the apparatus by means of sprocket wheel 12. Apparatus of this type is more fully described in applicant's assignee's Patent No. 3,081,668.

Figure 4:
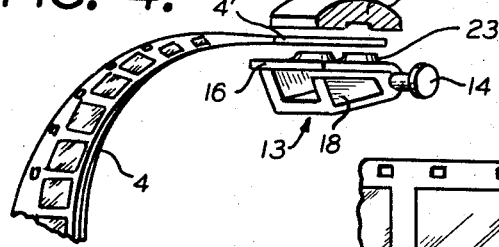
FIG. 4 is an exploded perspective view illustrating the film extension means with its relationship to the film end.
Figure 3:
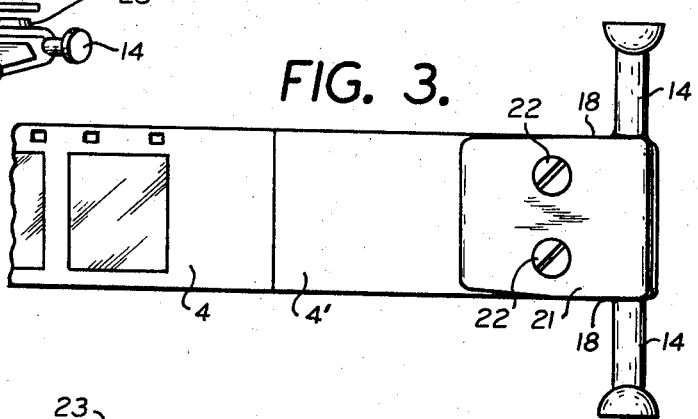
FIG. 3 is a top plan view looking down at a film end to which the extension means has been applied.
Figure 2:
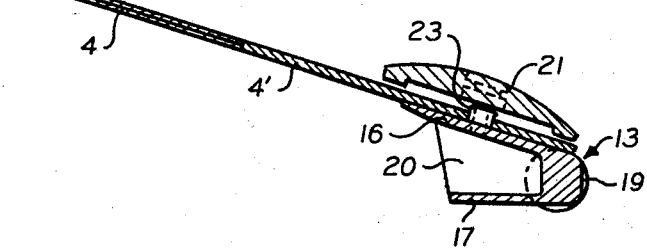
FIG. 2 is a cross-sectional view through the leader end of the film showing the extension means as it is being applied to the free end of the film leader.

In accordance with the inventive improvement, the film 4 is provided with a film extension means 13 as best seen in FIGS. 2 to 4. Laterally extending reel engaging headed pins 14 are extended from the extension means. This film extension means 13 comprises a base portion having an upper wall 16 with a relatively smooth film seating surface at the upper end thereof as viewed in FIGS. 2 and 4, on which the free end of the leader 4' of film 4 is adapted to be positioned. Spaced from the upper wall 16 is a lower wall 17 which is joined to the upper wall by means of side walls 18 and nose 19, as best seen in FIGS. 3 and 4. Walls 16 and 17 diverge from nose 19 to provide recess 20 therebetween.

This transport arm engaging recess 20 formed between upper wall 16 and lower wall 17 is adapted for engagement by the free end of transport arm 5, as best seen in FIG. 1, and is of substantially triangular vertical cross section to provide camming coaction with the hook end of transport arm 5.

The relatively smooth upper surface of upper wall 16 constitutes a seat for the free end of leader 4' of the film 4, and to increase the area of film contact, the upper wall 16 projects beyond wall 17, as best seen in FIG. 2.

In order to implement securement of the free end of leader 4' to the extension means 13, locking plate 21 is provided for selective securement over the film positioned on the film seating surface on upper wall 16. Locking plate 21, film leader 4', and the seating surface of upper wall 16 are formed with mating apertures, with the apertures in upper wall 16 being threaded to receive screws 22. The threaded apertures in upper wall 16 are preferably provided by means of internally threaded collars 23 protruding from the plane of the seating surface of upper wall 16. These collars serve the two-fold function of providing the threaded aperture for engagement by screws 22, and additionally acting to implement the location of the film when it is being positioned on the seating surface of wall 16.

OPERATION

In use, the aforedescribed extension means 13 is secured to the free leader end 4' of film 4. It is preferred to reinforce this leader to minimize tears, deformation or other damage to the film. This reinforcement can be obtained by adhesively securing a reinforcing member formed of sheet plastic or metal. Aluminum Phosphor bronze sheets are found particularly suitable for this reinforcing purpose.

The free end of leader 4' of the film 4 is seated on the relatively smooth upper surface of upper wall 16 with the previously formed apertures in the leader end 4' arranged to encompass the collar 23, as best seen in FIGS. 2 and 4. Thereafter the locking plate 18 is positioned over the free end of leader 4' with the aperture in the locking plate aligned with the collar 23, and the screws 22 inserted to secure the locking plate in position over the leader 4'.

The film is then subject to being fed through the projection apparatus, and secure engagement of the film by the film transport arm 5 is insured due to the interengaging relationship between the free end of the transport 5 and the recess 20. Reel engaging pins 14 are engaged by the reels 3 to effect desired operation.

The above disclosure has been given by way of illustration and elucidation, and not by way of limitation, and it is desired to protect all embodiments of the herein disclosed inventive concept within the scope of the appended claims.

What is claimed is:

1. In an automatic film projector having a film transport mechanism, a film extension means for implementing engagement of the film transport mechanism with the free end of the film, said film extension means comprising a base having a relatively smooth film seating surface upon which the free end of the film may be seated, said base having a threaded aperture therein, a locking plate overlying said film seating surface and the film thereon, said locking plate having an aperture therein in register with said threaded aperture, and a bolt passing through said plate aperture and threadedly engaging said threaded aperture for securing said plate to said base with said film clamped therebetween.

2. The apparatus of claim 1, wherein said smooth film seating surface of said base has an upstanding collar, said threaded aperture extends through said collar, and the free end of said film has an aperture to receive said collar.

3. The apparatus of claim 2, wherein said plate is undercut in register with said collar and film aperture to receive said collar therein.

4. The apparatus of claim 3, wherein said base comprises angularly related upper and lower walls defining a wedge shaped recess therein, and further comprising a pair of oppositely extending headed pins secured to said base in laterally extending relation therefrom.

References Cited

UNITED STATES PATENTS

| | | | |
|---|---|---|---|
| 1,232,753 | 7/1917 | Baluta | 242—74 |
| 1,996,782 | 4/1935 | Wood. | |
| 3,081,668 | 3/1963 | Nistri | 352—123 |
| 3,169,721 | 2/1965 | Laa et al. | 242—55.13 |

GEORGE F. MAUTZ, *Primary Examiner.*